United States Patent
Gan et al.

(12)

(10) Patent No.: US 10,853,735 B1
(45) Date of Patent: Dec. 1, 2020

(54) MAXIMIZING QUANTIFIABLE USER INTERACTION VIA MODIFICATION OF ADJUSTABLE PARAMETERS

(71) Applicant: Amazon Technologies, Inc., Seattle, WA (US)

(72) Inventors: Yu Gan, Seattle, WA (US); Cédric Philippe Archambeau, Berlin (DE); Rodolphe Jenatton, Berlin (DE); Jim Huang, Seattle, WA (US); Fabian Lutz-Frank Wauthier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1214 days.

(21) Appl. No.: 15/174,108

(22) Filed: Jun. 6, 2016

(51) Int. Cl.
*G06N 7/00* (2006.01)
*G06F 3/0484* (2013.01)
*G06F 16/2457* (2019.01)

(52) U.S. Cl.
CPC .......... *G06N 7/005* (2013.01); *G06F 3/0484* (2013.01); *G06F 16/24578* (2019.01)

(58) Field of Classification Search
None
See application file for complete search history.

(56) References Cited

U.S. PATENT DOCUMENTS

| | | | |
|---|---|---|---|
| 9,817,846 B1* | 11/2017 | Srinivasan | G06F 16/9535 |
| 2011/0035276 A1* | 2/2011 | Ghosh | G06Q 30/02 |
| | | | 705/14.46 |

OTHER PUBLICATIONS

Madera et al. "A method for optimizing a bidding strategy for online advertising through the use of intuitionistic fuzzy systems" Feb. 20, 2016, all pages (Year: 2016).*

* cited by examiner

*Primary Examiner* — Daniel C Puentes
(74) *Attorney, Agent, or Firm* — Eversheds Sutherland (US) LLP

(57) ABSTRACT

Systems, methods, and computer-readable media are disclosed for maximizing quantifiable user interaction via modification of adjustable parameters. In one embodiment, an example method may include determining a first output to maximize, where the first output is a function of a first adjustable parameter and a second adjustable parameter, determining first data comprising a first actual value of the first output when the first adjustable parameter is set to a first value and the second adjustable parameter is set to a second value, and determining a first predictive model that generates a first predicted value of the first output. Example methods may include determining, using the first predictive model, a third value for the first adjustable parameter and a fourth value for the second adjustable parameter to maximize the first predicted value, and sending the third value and the fourth value.

20 Claims, 6 Drawing Sheets

MAXIMIZING QUANTIFIABLE USER INTERACTION VIA MODIFICATION OF ADJUSTABLE PARAMETERS

BACKGROUND

Certain user interactions may be desired in response to presented content. For example, a desired response to a survey presented to a user may be for the user to complete the survey. In another example, a desired response to a message requesting feedback sent to a user may be for the user to reply with feedback. In certain instances, user interactions may be quantifiable. For example, a response rate for messages requesting feedback may be determined to be 10%, meaning that feedback was received from 10% of the users to which the message requesting feedback was sent. User interaction may be affected by certain parameters that affect delivery of content. As a result, adjusting such parameters may affect user interaction.

Figure 1:
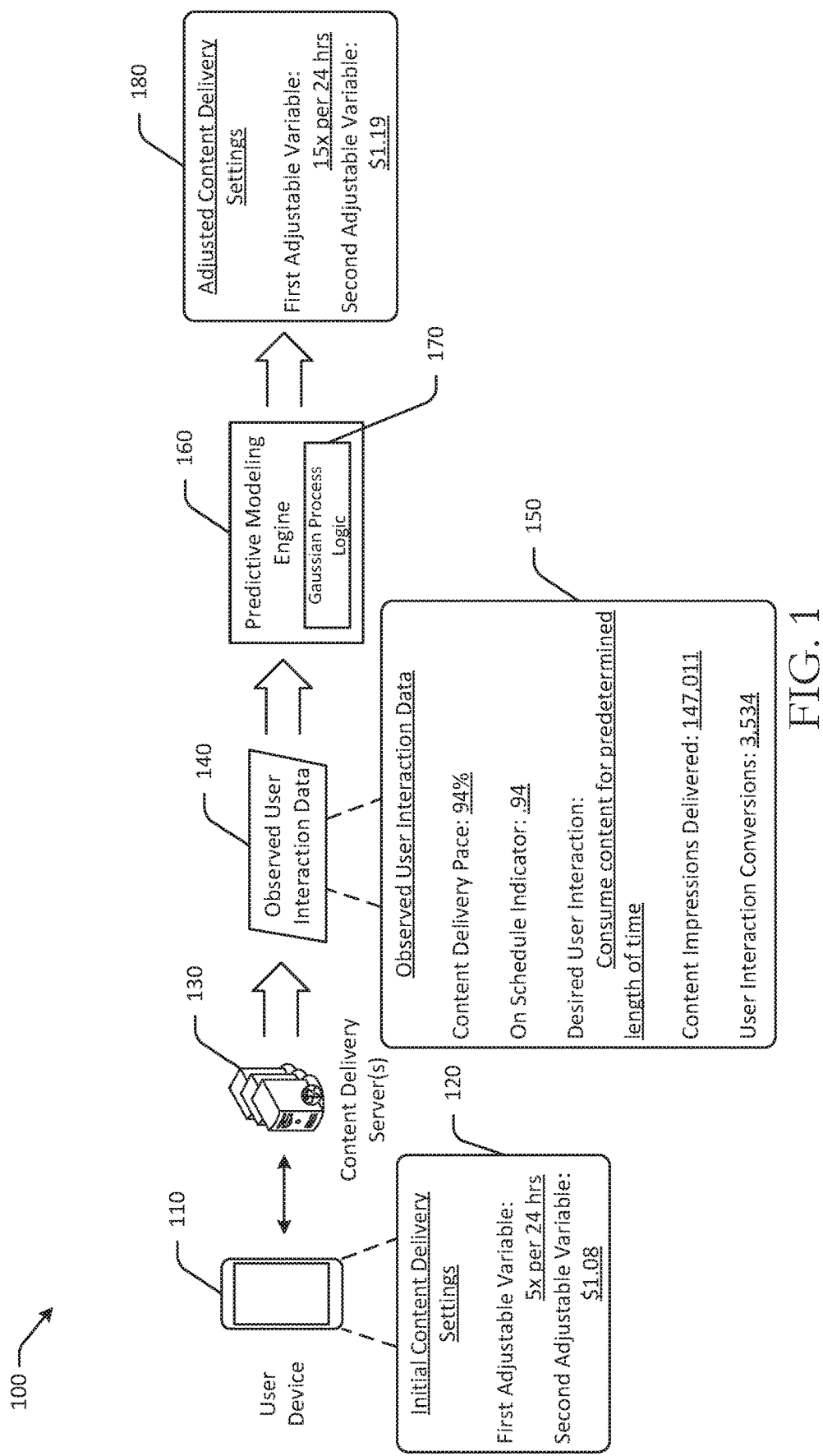
FIG. 1 is a hybrid system and process flow diagram illustrating maximizing quantifiable user interaction via modification of adjustable parameters in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Content creators or content providers may desire to deliver content to particular users, types or groups of users, or other targeted users. Content creators or content providers may also desire to deliver certain content within a particular period or length of time. In generating content for delivery, content creators or content providers may desire a particular user response or user interaction in response to consuming the content. For example, a content creator may desire a user response or user interaction of reading or writing product reviews after consuming content, or another desired user response or user interaction. Due to the costs associated with content delivery, content creators or content providers may provide guidelines or delivery constraints on delivery of content to users. Delivery of content may be affected by a number of different parameters, such as cost of delivery, length of flight time of content, constraints on delivery (e.g., targeting constraints for users, etc.), distribution channels, and other parameters. Each parameter, however, may affect user interaction and/or a rate of user interaction. Content creators may have certain goals for content, such as a goal of maximum user interaction, a goal of maximum user reach, or another goal. Accordingly, content creators or content providers may desire to maximize user interaction in response to consumption of content created, or otherwise provided, by the content creator or content provider.

In the context of online content delivery, content may be delivered for presentation (e.g., rendering) in an available content slot. Presentation of the content in an available content slot may be referred to as serving an impression. As used herein, the terms "content slot" or "available content slot" may refer generally to a location, environment, or placeholder in which, or in connection with which, an impression of content may be served. In a more specific context, these terms may refer to, for example, a particular location on a web page or within an application at which an impression of content may be presented to and potentially consumed by a user.

This disclosure relates to, among other things, systems, methods, computer-readable media, techniques, and methodologies for maximizing quantifiable user interaction via modification of adjustable parameters. Content creators, such as advertisers, brand owners, or other content creators, may develop marketing or other content campaigns that are directed towards specific consumers or that are for consumption over a particular flight time (e.g., 1 month, winter season, New Year's holiday, etc.). For example, a content campaign may be directed toward a target consumer, which may be a consumer within a certain demographic or certain geography, a consumer that has certain attributes (e.g., recent purchases or browsing history, etc.), a consumer that has specific preferences or characteristics, or other targeting criteria. Delivery of content to consumers may be affected by a number of parameters, including, for example, a budget for delivery of the content, a frequency cap associated with the content campaign, and other parameters.

Content creators or content providers may desire to achieve maximum effectiveness of a content campaign. Effectiveness of a content campaign may be determined, for example, by content campaign goals (e.g., a number of desired user interactions, such as purchases, click-throughs, new customer acquisition, increase in sales, certain click rates, etc.) and/or by determining whether a consumer presented with the content reacts in a desired manner (e.g., clicks on the content, buys the product, etc.). Campaign performance may also be measured or determined based on a return on content delivery budget (e.g., a ratio of user interactions attributed to presentation of the content to users to the content delivery budget, etc.), or by an on schedule indicator (e.g., ratio of budget consumed to expected budget consumed with a linear delivery profile, etc.). To accomplish the goals of the content campaign, content creators or content providers may desire to spend a budget allocated for the content campaign in a manner so as to maximize desired user interaction.

Content delivery may be impacted by a number of parameters. For example, in some instances, an auction process may be involved in delivering content. A content provider with the highest bid in an auction for a particular content slot may present content in the content slot upon winning the auction. To determine a bid for submission in an auction, a number of parameters may be considered. For example, the bid price may be a function of a base bid value, which may be a component of a bid calculated in real-time during an auction, a maximum bid value, which may be a multiple of a base bid, or another parameter. Other parameters, such as a frequency cap or a delivery pacing metric may be used to determine a bid. For example, a frequency cap parameter may be set to a certain value. The frequency cap may represent a maximum number of times a particular user may be presented with particular content in a time interval. In one example, a frequency cap may be set to 15 times in 24 hours, meaning that a particular user may be presented with the same content up to 15 times within any 24 hour period. If the user has already been presented with content 15 times within a preceding 24 hour period, then a bid may not be submitted in an auction to present the content to the same user for a sixteenth time.

Content campaign performance or effectiveness, as determined by quantifiable desired user interactions, may be increased or otherwise increased by manipulation of one or more factors or parameters used in a function or model that determines bid values for auctions to present the content. Embodiments of the disclosure may optimize or maximize function output, or campaign performance, by manipulation of one or more parameters used in a function particular to a piece of content or a particular content campaign. For example, embodiments of the disclosure may adjust a base bid value to change a number of auctions won, or to improve a quality of auctions won. In another example, a frequency cap may be adjusted so as to funnel users through a sales funnel that may otherwise not move through the sales funnel due to insufficient contact between a content campaign and a user. Embodiments of the disclosure may optimize parameter values or settings over the flight time, or a length of time a content campaign is active, of a content campaign by generating recommendations for parameter adjustments. Recommendations may be generated periodically. To generate recommendations, embodiments may analyze observed data, or actual data collected on user behavior or reactions to content, as well as content campaign performance. The observed data may be used to generate a predictive model, and adjustments to one or more parameters in the predictive model may be tested to determine which adjustments, if any, are most likely to increase performance of the content campaign. An iterative process may be completed until parameter settings converge to optimal settings and campaign performance is optimized.

Referring to FIG. 1, an example use case 100 with a system and process flow diagram illustrating maximizing quantifiable user interaction via modification of adjustable parameters is depicted. In the example of FIG. 1, a content campaign may be initiated by a campaign manager. The campaign manager may set initial parameters for the content campaign using a user device 110. For example, the campaign manager may set initial content delivery settings 120 for the content campaign. In some embodiments, the initial settings may be determined automatically, based on historical data, for example. The initial content delivery settings 120 may include a first value or a first setting for a first adjustable variable. The first adjustable variable may be a frequency cap, and the first value may be 5 times in any 24 hour period. The campaign manager may set a second adjustable variable, such as a base bid, to a second value of $1.08. In some embodiments, the campaign manager may manually adjust one or more values of adjustable variables or parameters over the course of a campaign, based at least in part on recommendations generated by embodiments of the disclosure. In other embodiments, one or more values of adjustable variables may be automatically adjusted so as to optimize campaign performance.

The user device 110 may be in wired or wireless communication with one or more content delivery server(s) 130. The content delivery server 130 may receive the initial content delivery settings 120 and may implement the initial content delivery settings 120 in delivering content associated with the content campaign. For example, the content delivery server 130 may target certain users for delivery of content based at least in part on targeting criteria associated with the content campaign, and may also manage budget consumption of a content delivery budget associated with the content campaign. For example, a content campaign may desire to spend an entire content delivery budget by the end of the campaign flight time, and may also desire for relatively smooth budget consumption over time (e.g., relatively equal budget consumption each day of the campaign, with the entire budget consumed by the end of the flight time, etc.). The content delivery server 130 may implement one or more rules or criteria related to presentation of content to users.

As a campaign starts running, embodiments of the disclosure may generate observed user interaction data 140. The observed user interaction data 140 may be generated by the content delivery server 130 or another server in communication with the content delivery server via one or more networks. The observed user interaction data 140 may include one or more data points generated by monitoring actual performance of the content campaign. The observed user interaction data 140 may include metrics 150 indicative of quantifiable user interactions. In FIG. 1, the metrics 150 may include a content delivery pace percentage of 94%, which may indicate a percentage of actually delivered content impressions relative to an expected number of delivered impressions, and an on schedule indicator of 0.94, indicating that the content delivery is 6% behind a smooth or linear delivery profile. The observed user interaction data 140 may also include a desired user interaction or user response indicator, which may also be referred to as a function output, which may be for the user to consume content for a predetermined length of time in FIG. 1. For example, the content in the campaign may be a video and consumption of at least 1 minute of the video may be the desired output or goal of the campaign. The observed user interaction data 140 may also include a number of content impressions delivered of 147,011, and a number of user interaction conversions, or a number of desired user responses, of 3,534. Other embodiments may include additional or fewer, or different data, as well as calculations, such as conversion rates and the like.

The observed user interaction data 140 may be fed or otherwise communicated to a predictive modeling engine 160. The predictive modeling engine 160 may be stored at the content delivery server 130 or at another server in communication with the content delivery server 130. The predictive modeling engine 160 may be configured to generate one or more predictive functions or models based at least in part on the observed user interaction data 140 and the initial content delivery settings 110. In some embodiments, the predictive modeling engine 160 may include Gaussian process logic 170 that may be implemented to generate a predictive function modeled on a Gaussian process. Gaussian processes may be used for the predictive modeling because of properties inherited from the normal. Distributions of various derived quantities can be obtained explicitly using Gaussian processes, and such quantities may include the average value of the process over a range of times and the error in estimating the average using sample values at a small set of times. The predictive model may be configured to fit the observed user interaction data using the known variable settings.

The predictive model may be used to generate one or more recommended adjustments to variable campaign delivery settings that may result in increased function output, where the output is the desired user interaction, thereby increasing effectiveness of a content campaign. In some embodiments, an acquisition function may be used to determine which values to recommend as adjustments. The predictive modeling engine 160 may generate confidence scores for one or more of the recommended adjustments, and may rank the recommended adjustments based at least in part on the confidence score. The confidence scores may be indicative of a likelihood that the particular adjustment will result in a maximized output of the function. In some embodiments, the confidence score may be generated for sets of more than one recommended adjustment. For example, if recommendations for two variables are generated, confidence scores may be generated for each set of two potential adjustments, rather than for individual adjustments. The confidence scores for each set may be ranked, and the set with the highest likelihood of maximizing the output of the predictive model may be selected as a recommendation. The recommended adjustment for each respective variable with the highest confidence score may be recommended as an adjustment. In some embodiments, the variables may be automatically adjusted, for example, by the predictive modeling engine 160. In some embodiments, confidence scores may not be compared against a confidence score threshold, and may instead be weighted based at least in part on the confidence score. For example, an adjustment with a relatively high confidence score may be given a relatively high weight, while an adjustment with a relatively low confidence score may be given a relatively low weight. Model accuracy may also be weighted or determined based at least in part on confidence scores.

The predictive modeling engine 160 may generate one or more recommended adjustments to variables in the initial content delivery settings 120. For example, the predictive modeling engine 160 may recommend adjusting the first adjustable variable, or the frequency cap in FIG. 1, to 15 times per 24 hours, and may recommend adjusting the second adjustable variable, or the base bid, to $1.19 instead of $1.08. The recommended adjustments may be recommended because each had the highest relative confidence score for the respective variable, and may result in maximization of the function output, or in FIG. 1, the desired user conversion.

In some embodiments, the predictive modeling engine 160 may initiate the adjustments to the variables, while in other embodiments, the predictive modeling engine 160 may send adjusted content delivery settings 180 or recommended adjustment data to another server, such as the content delivery server 130.

By generating recommended adjustments for content delivery variables or other function values, embodiments of the disclosure may maximize function output and increase or improve campaign performance by increasing user interaction or desired user response. By generating new predictive models based at least in part on actual observed data, accuracy of predictive models can be determined and improved over time, resulting in faster convergence to optimal settings. As a result, campaign managers may not have to manually adjust content delivery parameters over the flight time of a campaign, because embodiments of the disclosure may automatically adjust variables or recommend adjustments for variables.

The systems, methods, computer-readable media, techniques, and methodologies for maximizing quantifiable user interaction via modification of adjustable parameters may result in improved campaign performance by determining optimal variable values or settings. As a result, manual manipulation of campaign parameters may not be needed.

Example embodiments of the disclosure provide a number of technical features or technical effects. For example, in accordance with example embodiments of the disclosure, certain embodiments of the disclosure may generate recommendations for campaign parameter values that may result in maximized output. Output may be a quantifiable user interaction or user response that is affected by one or more of the variable parameters. Embodiments of the disclosure may automatically adjust campaign parameter settings or values based at least in part on observed data and determine predictive models used to generate the recommended parameter values or settings. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
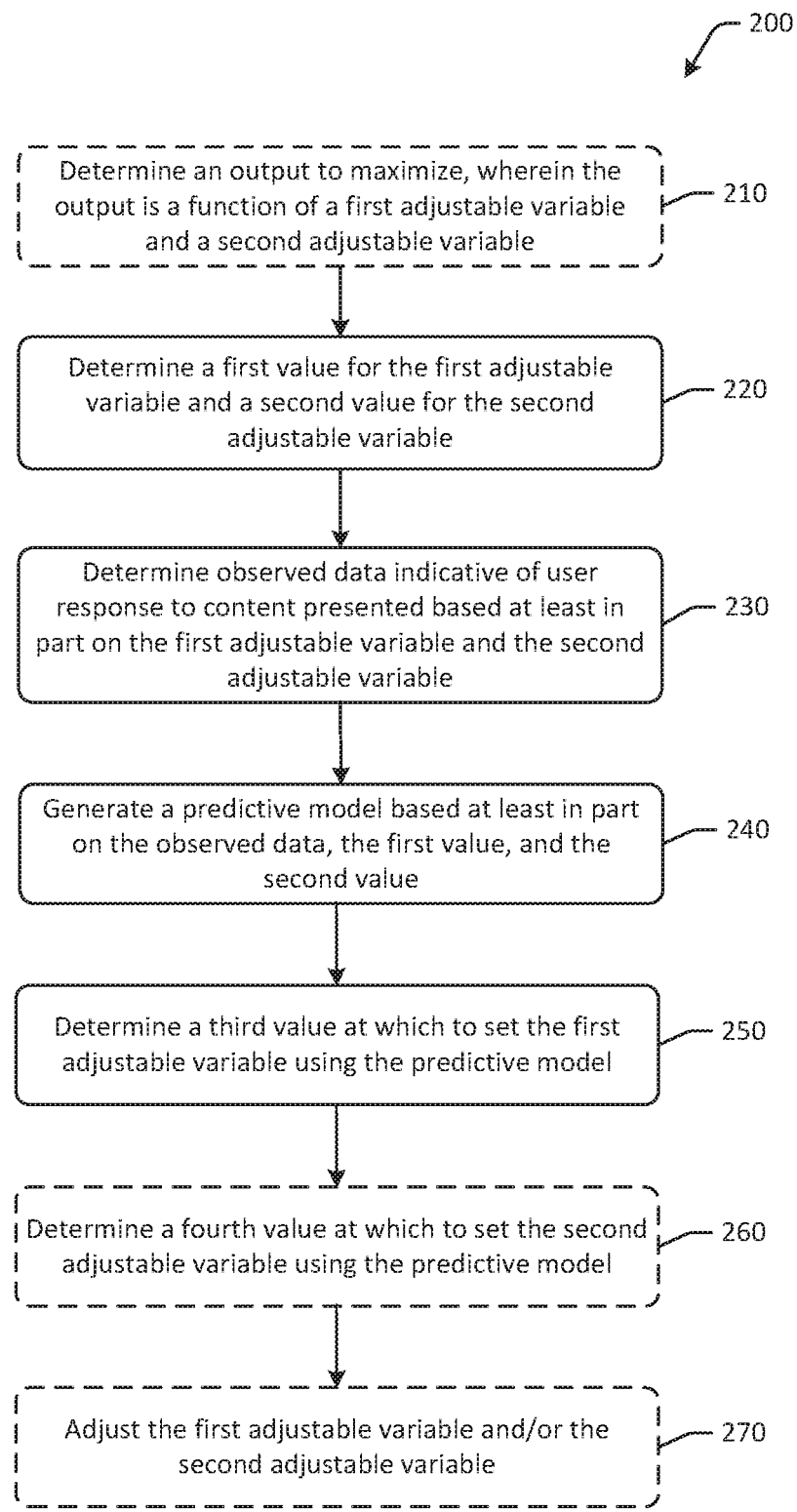
FIG. 2 is an example process flow diagram for maximizing quantifiable user interaction via modification of adjustable parameters in accordance with one or more embodiments of the disclosure.

Referring now to FIGS. 2-5, an example process flow 200 for maximizing quantifiable user interaction via modification of adjustable parameters in accordance with one or more embodiments of the disclosure is depicted in FIG. 2. Although certain operations are illustrated as occurring separately in FIG. 2, some or all of the operations may occur concurrently or partially concurrently.

At optional block 210 of the process flow, an output to maximize is determined, wherein the output is a function of a first adjustable variable and a second adjustable variable. For example, one or more variable management server(s) may receive an indication of an output of a function that is to be maximized via manipulation of one or more parameters of the function. The output of a function may be a goal of a content creator, in one example, such as a number of user interactions or a number of certain user interactions. In another example, an output to be maximized may be a number of purchases attributed to the content presented to users, where the output is a function of a base bid and a frequency cap. The first adjustable variable or parameter may therefore be the base bid and the second adjustable variable or parameter may be the frequency cap, or vice versa. Any other suitable parameters may be used. In some embodiments, a variable management server may receive an indication of the output to maximize, along with the related function and parameter identifiers, while in other embodiments, the variable management server may actively determine the adjustable variables or parameters based at least in part on the output to be maximized.

Block 220 of process flow 200 includes determining a first value for the first adjustable variable and a second value for the second adjustable variable. The first adjustable variable and the second adjustable variable may be variables or parameters in a function for which the output is the output to be maximized. For example, the first adjustable variable may be a base bid value or a maximum bid value, and the second adjustable variable may be a frequency cap, while the output of the function may be a content creator goal, such as a number of purchases attributed to the content presented to users or maximizing a return on content delivery budget.

In one embodiment, the first value and/or the second value may be received by the variable management server, while in other embodiments, the first value and/or the second value may be determined by the variable management server. For example, the variable management server may receive initial value inputs (e.g., the first value and the second value) manually entered by a user. In another example, the variable management server may determine recommended or initial values for the first adjustable variable and the second adjustable variable based at least in part on a goal of the content creator and/or an output to be maximized.

Block 230 of the process flow 200 includes determining observed data indicative of user response to content presented based at least in part on the first adjustable variable and the second adjustable variable. Content may be delivered at a delivery rate and/or delivery schedule based at least in part on the values or settings of the first adjustable parameter and/or the second adjustable parameter. In some embodiments, the variable management server may manage delivery of the content, while in other embodiments, the variable management server may communicate values for the first adjustable variable and the second adjustable variable to one or more remote servers, such as a content delivery server, to facilitate delivery of content.

The observed data may include data corresponding to user interaction data indicative of user interaction responsive to the content. For example, a content delivery server may monitor user interaction or user response of users that are presented with the content. Upon determining a user interaction occurrence, the content delivery server may log the particular user interaction (e.g., a purchase, a click-through, content consumption, span time, etc.), a user identifier, and/or contextual data. The observed data may be used to determine purchase rates or other quantifiable user interactions attributable to the content. For example, if a user is presented with, and consumes, the content, and then initiates a purchase of a product associated with the content within a predetermined time period (e.g., 5 days, 2 weeks, etc.), the purchase may be attributed to the content and logged as observed data.

The observed data may further include a first actual value, or an actual measured value, of the output while the first adjustable variable is set to the first value and the second adjustable variable is set to the second value. For example, the actual return on content delivery budget (as determined by purchase rates for purchases attributed to the content or the content campaign, etc.) may be determined while the first adjustable variable is set to the first value and the second adjustable variable is set to the second value. In another example, the actual on schedule indicators may be determined while the first adjustable variable is set to the first value and the second adjustable variable is set to the second value. The observed data may be data collected during a predetermined time interval, such as 12 hours, 1 day, or another time interval.

Block 240 includes generating a predictive model based at least in part on the observed data, the first value, and the second value. In some embodiments, computer-executable instructions of one or more module(s) stored at a variable management server may be executed to generate a predictive model that fits the observed data. The predictive model may be a function that maps to the observed data so as to generate a predicted output value based on adjustments to the first adjustable variable and the second adjustable variable. For example, the predictive model may generate a predicted return on content delivery budget based at least in part on an adjustment to the base bid and/or the frequency cap values of the function. In some embodiments, the predictive model may be modeled as a Gaussian process. A Gaussian process may be used for the predictive modeling because of properties inherited from the normal. Distributions of various derived quantities can be obtained explicitly using Gaussian processes, and such quantities may include the average value of the process over a range of times and the error in estimating the average using sample values at a small set of times.

Block 250 includes determining a third value at which to set the first adjustable parameter using the predictive model. The third value may be a value different than the first value that results in an increased output value for the predictive model or function. For example, the third value may be $2 for a base bid, and the first value may have been $1 for a base bid. The third value may result in an increased output value of the predictive model. In some embodiments, the variable management server may determine the third value for the first adjustable variable. In some embodiments, rather than determining a value for the first adjustable variable, an adjustment amount may be determined, such as +1, −0.2, or another adjustment amount that results in the maximization of the output of the predictive model.

Optional block 260 includes determining a fourth value at which to set the second adjustable variable using the predictive model. In some embodiments, more than one variable in the predictive function may be adjusted, while in other embodiments a single variable may be adjusted during a time interval. For example, the second adjustable variable may be adjusted in addition to the first adjustable variable. The second adjustable variable may be adjusted from a frequency cap of 5 impressions per day to 4 impressions per day, in one example. The adjustments to the first and second adjustable variables may result in maximization of the predictive model output.

Optional block 270 includes adjusting the first adjustable variable and/or the second adjustable variable. For example, the variable management server may adjust the first adjustable variable from the first value to the third value, and, if applicable, may adjust the second adjustable variable from the second value to the fourth value. In other embodiments, the variable management server may communicate the third value and/or the fourth value to another server, such as a content delivery server, to facilitate adjustment of the variables by the receiving server. In one example, a base bid or a maximum bid for delivering content may be adjusted from the first value to the third value.

The process flow 200 may be repeated periodically as subsequent observed data is received. For example, observed data may be received daily, and predictive models may be generated for each individual set of observed data, or for a set of historical observed data for any given content campaign. As the observed data is collected, the outputs of the predictive model may be maximized and the value recommendations for the first adjustable variable and/or the second adjustable variable may converge toward optimal values.

Figure 3:
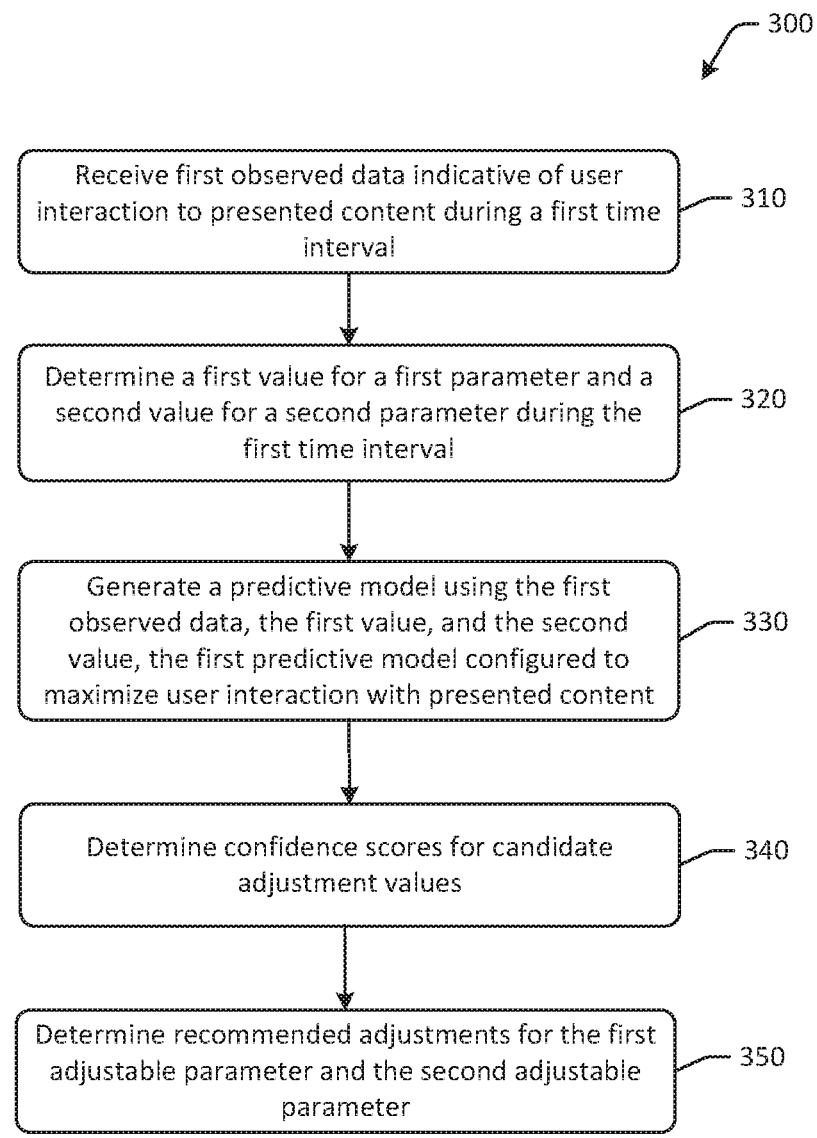
FIG. 3 is an example process flow diagram for generating parameter adjustment recommendations for adjustable parameters of a function in accordance with one or more example embodiments of the disclosure.

Referring to FIG. 3, an example process flow 300 for generating parameter adjustment recommendations for adjustable parameters of a function in accordance with one or more example embodiments of the disclosure is depicted.

At block 310, a predictive model engine may receive first observed data indicative of user interaction to presented content during a first time interval. The predictive model engine may be executed at a variable management server or another server on a content delivery network. The observed data may comprise parameter settings or values that were used during the first time interval, and the resulting content delivery metrics and/or user interaction data. Content delivery metrics may include a number of auctions won, a number of delivered impressions, a number of unique users, or other content delivery metrics. User interaction data may include purchases attributed to the content, clicks, engagements, or other interactions with, or as a result of, presentation of the content to a user.

Block 320 includes determining a first value for a first parameter and a second value for a second parameter during the first time interval. The predictive model engine may determine the first value and the second value based at least in part on the observed data. In other embodiments, the predictive model engine may receive the first value and the second value from another device, such as the variable management server.

Block 330 includes generating a predictive model using the first observed data, the first value, and the second value, the first predictive model configured to maximize user interaction with presented content. The predictive model engine may generate a predictive model or a function that fits or otherwise maps to the first observed data, using the known first value and known second value that were used during the first time interval. The first observed data may also include an actual output value, which may be used by the predictive model engine to generate the predictive model. The known first and second values, and the resulting actual output value, may be incorporated into the predictive model. Upon generating the predictive model, the predictive model engine may generate candidate adjustments to one or more adjustable parameters, such as the first parameter and/or the second parameter, so as to maximize a predicted output value of the predictive function. For example, a first candidate adjustment of +2 and a second candidate adjustment of +4 may be determined for the first parameter.

Block 340 includes determining confidence scores for candidate adjustment values. In some embodiments, the predictive model engine may calculate or otherwise compute a confidence score for one or more candidate adjustments to a particular parameter. The confidence score may be indicative of a likelihood that adjusting the particular parameter to that specific candidate adjustment will result in maximization of the output value of the predictive function. Upon determining confidence scores for the candidate adjustments to a particular parameter, a candidate adjustment with the highest relative confidence score may be selected as a recommended adjustment. Candidate adjustments may be generated by the predictive model engine for one or more adjustable parameters of the predictive function. Each of the candidate adjustments may be assigned a confidence score, and the candidate adjustments with the highest relative confidence scores may be selected as recommended adjustments for the parameter the candidate score is associated with. As a result, a function with only one adjustable parameter may have a single recommended adjustment, while another function may have two or more recommended adjustments. In some embodiments, a candidate adjustment may meet a minimum confidence score or minimum confidence threshold in order to be a recommended adjustment. Other embodiments may determine weights for candidate adjustments rather than using confidence score minimums or other hard thresholds. As a result, at times when available data is limited, such as near a campaign beginning, predictive models may still explore with little confidence in order to determine any potential learnings. In some embodiments, an acquisition function may be used to determine better or more optimal values for particular parameters that may result in increased output.

In some embodiments, confidence scores may also be generated for predictive models. For example, the predictive model engine may determine a difference between an actual output value for certain parameter settings based on observed data and a predicted output value that was generated by the predictive model engine before the observed data was received. The predictive model engine may use the difference to determine a confidence score for the predictive function or model, where the confidence score is indicative of a likelihood of accuracy of the predictive function or model. In some embodiments, the confidence score of a predictive function may meet a minimum confidence threshold prior to being used to determine recommended adjustments.

Block 350 includes determining recommended adjustments for the first adjustable parameter and the second adjustable parameter. The predictive model engine may determine the candidate adjustments with the highest relative confidence scores and may select the highest scored candidate adjustments as recommended adjustments for the parameter the candidate score is associated with. As a result, a function with only one adjustable parameter may have a single recommended adjustment, while another function may have two or more recommended adjustments. In some embodiments, a candidate adjustment may meet a minimum confidence score or minimum confidence threshold in order to be a recommended adjustment.

Figure 4:
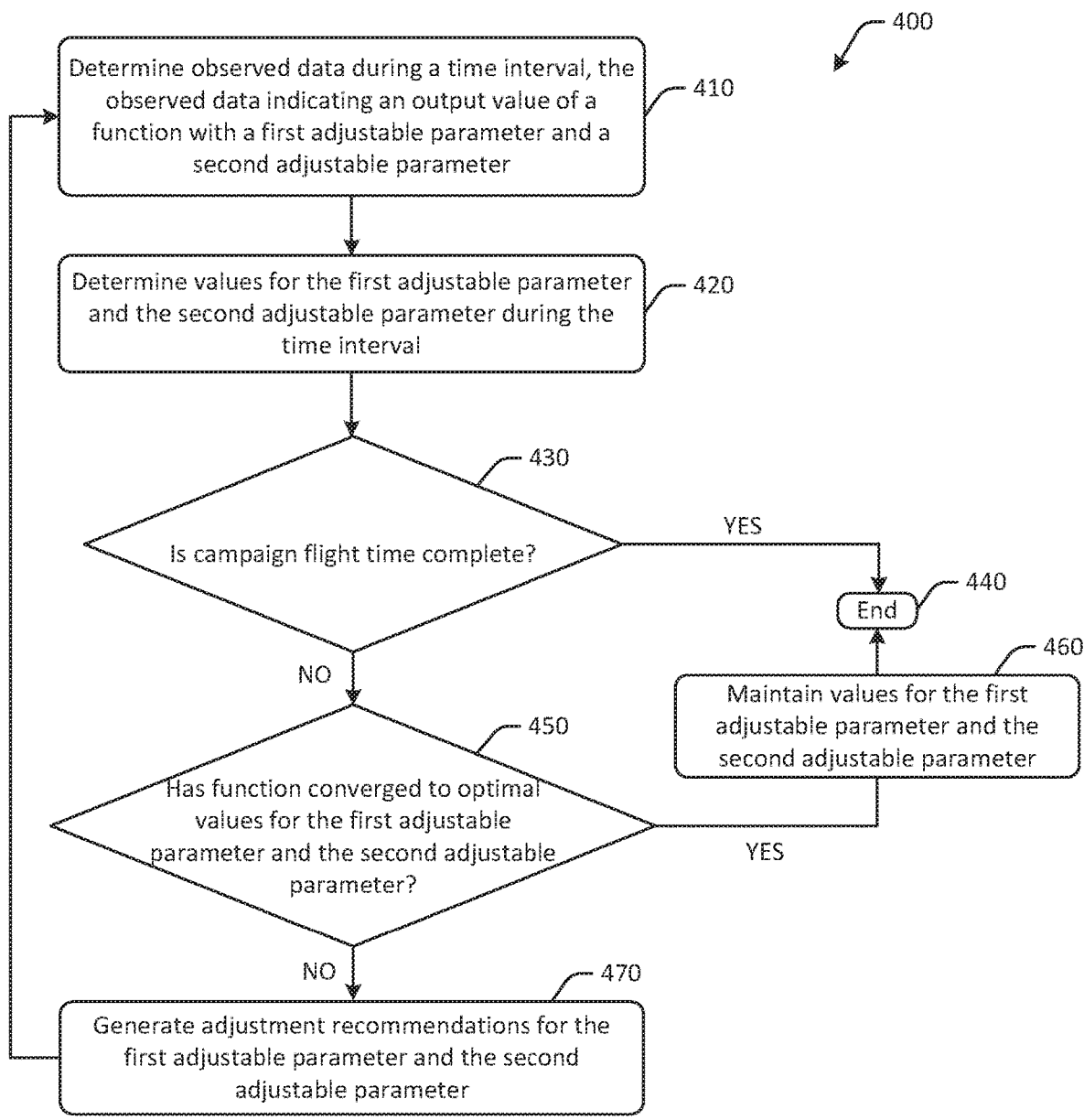
FIG. 4 is an example process flow diagram for maximizing quantifiable user interaction via modification of adjustable parameters in accordance with one or more embodiments of the disclosure.

FIG. 4 depicts an example iterative process flow 400 for maximizing quantifiable user interaction via modification of adjustable parameters in accordance with one or more embodiments of the disclosure. At block 410 of the process flow 400, observed data during a time interval is determined, the observed data indicating an output value of a function with a first adjustable parameter and a second adjustable parameter. The output value may be a return on content delivery budget, an on schedule indicator, or another metric indicative of campaign performance. The first and/or second adjustable parameters may be any suitable adjustable parameter, such as base bid, maximum bid, frequency cap, or another parameter.

At block 420, values for the first adjustable parameter and the second adjustable parameter are determined during the time interval. In some embodiments, the values for the first adjustable parameter and the second adjustable parameter may be included in the observed data. The observed data may reflect campaign performance while the first adjustable parameter and the second adjustable parameter were at the values determined at block 420.

At determination block 430, a determination is made as to whether a campaign flight time is complete. For example, computer-executable instructions of one or more campaign management module(s) stored at a variable management server may be executed to determine a remaining active time or flight time for a campaign. If it is determined that the flight time is complete at determination block 430, the process flow 400 may end at block 440.

If it is determined that the campaign flight time is not complete at determination block 430, the process flow 400 may proceed to determination block 450, at which a determination is made as to whether the function has converged to optimal values for the first adjustable parameter and the second adjustable parameter. For example, computer-executable instructions of one or more variable adjustment module(s) stored at a variable management server may be executed to determine whether values for the first adjustable parameter and the second adjustable parameters are optimal values. In one embodiment, this determination may be made by analyzing output performance of the function using the current values of the first adjustable parameter and the second adjustable parameter, and generating a predictive model based at least in part on the observed data and current values. The predictive model may be used to determine whether any potential adjustment to one or both the first adjustable parameter and the second adjustable parameter may result in an increased output. If it is determined that an adjustment to one or both the first adjustable parameter or the second adjustable parameter may result in an increased output, a confidence score may be determined for the potential adjustment. If the confidence score meets a minimum confidence score threshold, the current values may be determined not to be optimized. If the confidence score does not meet the minimum confidence score threshold, or if no adjustment(s) result in increased output, the current values may be determined to be optimal.

If it is determined at determination block 450 that the function has converged to optimal values for the first adjustable parameter and the second adjustable parameter, the process flow 400 may proceed to block 460, at which the values for the first adjustable parameter and the second adjustable parameter are maintained. The process flow 400 may then end at block 440.

If it is determined at determination block 450 that the function has not converged to optimal values for the first adjustable parameter and the second adjustable parameter, the process flow 400 may proceed to block 470, at which adjustment recommendations for the first adjustable parameter and the second adjustable parameter may be generated. For example, computer-executable instructions of a predictive modeling engine or one or more variable adjustment module(s) stored at a variable management server may be executed to generate one or more recommended adjustments to content delivery variables that may result in increased function output. The process flow 400 may then return to block 410 in an iterative process to be completed after additional observed data is available, or after a period of time has elapsed.

In subsequent iterations of the process flow 400, additional predictive models or functions may be generated to determine adjustment recommendations. Predictive models may be generated for specific segments of observed data, or for some or all historical data associated with a content campaign. The process flow 400 may be performed until optimal values are determined for the adjustable parameters.

Figure 5:
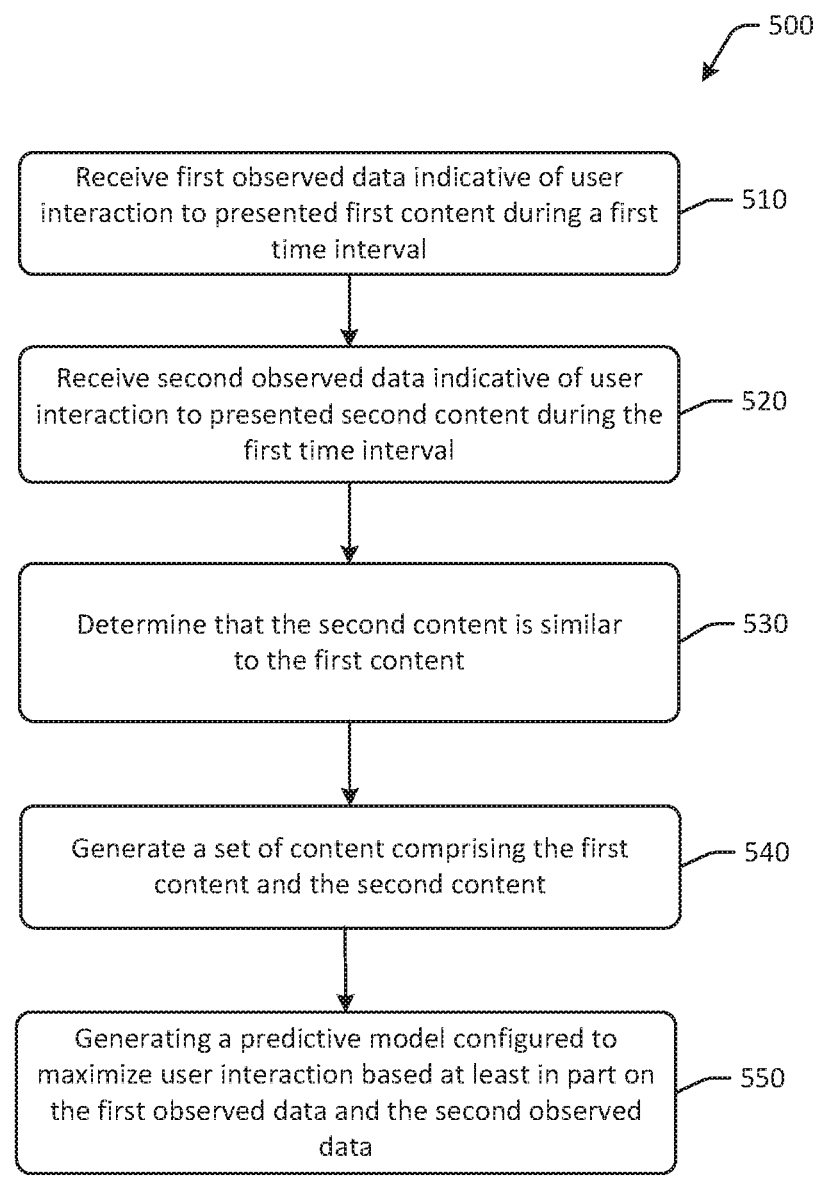
FIG. 5 is an example process flow diagram for determining content similarity and generating predictive models in accordance with one or more embodiments of the disclosure.

FIG. 5 is an example process flow 500 for determining content similarity and generating predictive models in accordance with one or more embodiments of the disclosure. In some embodiments, predictive models may be generated for particular content using observed data for the particular content, or predictive models may be generated for particular campaigns using observed data for all content associated with the particular campaign. In other embodiments, predictive models may be generated based at least in part on observed data for a number of campaigns that are determined to be similar to the campaign or content for which the predictive model is being generated. Recommendations generated by a predictive model based at least in part on aggregated observed data may be applied to one or more campaigns of the similar campaigns. For example, the parameters of one of the set of similar campaigns may be adjusted based at least in part on the recommendations, or the parameters of more than one, or all, of the set of similar campaigns may be adjusted based at least in part on the recommendations. Content similarity may be determined based at least in part on similarity metrics rather than thresholds, and observed data may be weighted differently based at least in part on a level of similarity between content.

Embodiments of the disclosure may generate clusters or sets of similar ads, and use aggregated observed data to build predictive models. The predictive models may be used to generate parameter adjustment recommendations that maximize output for each of the campaigns in the cluster or set of similar ads. In some instances, observed data across all existing campaigns, regardless of similarity, may be aggregated and considered in generating predictive models. Some embodiments may employ a Kronecker products structure in determining similar content, which may include a portion of pre-clustered content defined as similar, and may allow the system to determine additional content similarities based at least in part on observed data.

At block 510 of the process flow 500, first observed data is received, where the first observed data is indicative of user interaction to presented first content during a first time interval. The first observed data may be received by a variable management server.

At block 520, second observed data is received, where the second observed data is indicate of user interaction to presented second content during the first time interval. The second observed data may be received by the variable management server. The second content may be associated with the same campaign as the first content, or with a different campaign.

At block 530, it is determined that the second content meets a similarity threshold with respect to the first content. Similarity may be determined, for example, by one or more content similarity determination module(s) stored at a variable management server. Similarity may be determined based at least in part on any number of factors, such as a similarity between products or services associated with the respective content, advertisers associated with the respective content, targeting criteria associated with the respective content, product identifiers associated with the respective content, or other factors. For example, a content similarity threshold may be satisfied when each respective piece of content or the associated campaign is associated with at least one of the same product identifier, the same targeting criteria, the same distribution channel, or another delivery metric.

In one example, content similarity may be based at least in part on browse node similarity between a first browse node associated with the first content and a second browse node associated with the second content. A browse node may be represented as a set of webpages associated with a brand, product/service, or type of product/service, etc. To determine browse node similarity, a first set of product identifiers associated with the first content may be determined. A first average browse node hierarchy for the first set of product identifiers may be determined. An average browse node hierarchy may be an alphanumeric structure of the browse node or the associations and/or classifications of the product identifiers associated with the first content.

A second set of product identifiers associated with the second content may be determined. A second average browse node hierarchy for the second set of product identifiers may be determined. A distance between the first average browse node hierarchy and the second average browse node hierarchy may be determined. The distance may be represented as a numeric or alphanumeric difference and may be indicative of an overlap or similarity between the first average browse node and the second average browse node. A determination may be made as to whether the distance meets a similarity threshold. The similarity threshold may be a numeric value or another metric to which the difference can be compared.

At block 540, a set of content is generated comprising the first content and the second content, upon determining that the first content and the second content meet the content similarity threshold.

At block 550, a predictive model is generated, where the predictive model is configured to maximize user interaction, or function output, based at least in part on the first observed data and the second observed data. Accordingly, the predictive model may be more accurate than a predictive model generated by a single set of observed data due to the increase data available when the predictive model is generated. By aggregating observed data across a number of similar campaigns, predictive model accuracy may be improved as a result of increased observed data, which may lead to faster convergence of optimal values for adjustable parameters of a function, and improved effectiveness for some or all of the similar campaigns.

One or more operations of the method, process flows, or use cases of FIGS. 1-5 may have been described above as being performed by a user device, or more specifically, by one or more program module(s), applications, or the like executing on a device. It should be appreciated, however, that any of the operations of methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
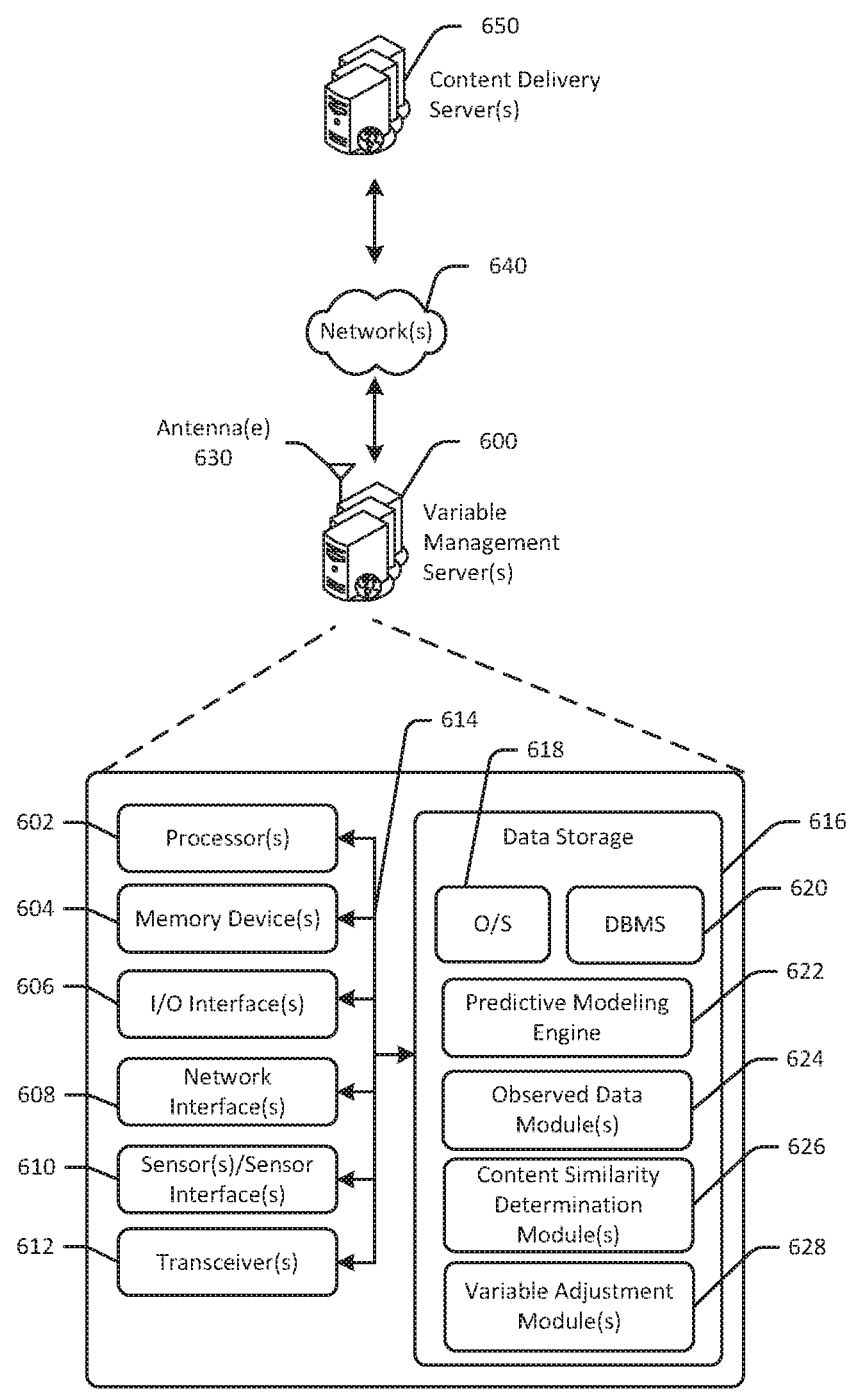
FIG. 6 schematically illustrates an example architecture of a system in accordance with one or more embodiments of the disclosure.

FIG. 6 is a schematic block diagram of one or more illustrative variable management server(s) 600 in accordance with one or more example embodiments of the disclosure. The variable management server(s) 600 may include any suitable computing device capable of receiving and/or generating audio including, but not limited to, a server system, a mobile device such as a smartphone, tablet, e-reader, wearable device, or the like; a desktop computer; a laptop computer; a content streaming device; a set-top box; or the like. The variable management server(s) 600 may correspond to an illustrative device configuration for the variable management servers of FIGS. 1-5.

The variable management server(s) 600 may be configured to communicate via one or more networks 640 with one or more servers, user devices, or the like. For example, in the illustration of FIG. 6, the variable management server(s) 600 may be configured to communicate with a content delivery system(s) 650. The variable management server(s) 600 may be configured to actively or passively manage one or more aspects of a content campaign, such as content delivery parameters. The content delivery system(s) 650 may be configured to deliver one or more pieces of content and may further be configured to engage in a bidding process for auctions to present content. In some embodiments, a single remote server or single group of remote servers may be configured to perform more than one type of content delivery functionality.

The variable management server(s) 600 may be configured to communicate via one or more networks 640. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the variable management server(s) 600 may include one or more processors (processor(s)) 602, one or more memory devices 604 (generically referred to herein as memory 604), one or more input/output ("I/O") interface(s) 606, one or more network interface(s) 608, one or more sensors or sensor interface(s) 610, one or more transceivers 612, and data storage 616. The variable management server(s) 600 may further include one or more buses 614 that functionally couple various components of the variable management server(s) 600. The variable management server(s) 600 may further include one or more antenna(e) 630 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 614 may include at least one of a system bus, a memory bus, an address bus, or a message bus, and may permit exchange of information (e.g., data (including computer-executable code), signaling, etc.) between various components of the variable management server(s) 600. The bus(es) 614 may include, without limitation, a memory bus or a memory controller, a peripheral bus, an accelerated graphics port, and so forth. The bus(es) 614 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the variable management server(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 616 may include removable storage and/or non-removable storage including, but not limited to, magnetic storage, optical disk storage, and/or tape storage. The data storage 616 may provide non-volatile storage of computer-executable instructions and other data. The memory 604 and the data storage 616, removable and/or non-removable, are examples of computer-readable storage media (CRSM) as that term is used herein.

The data storage 616 may store computer-executable code, instructions, or the like that may be loadable into the memory 604 and executable by the processor(s) 602 to cause the processor(s) 602 to perform or initiate various operations. The data storage 616 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 616 for non-volatile storage.

More specifically, the data storage 616 may store one or more operating systems (O/S) 618; one or more database management systems (DBMS) 620; and one or more program module(s), applications, engines, computer-executable code, scripts, or the like such as, for example, one or more predictive modeling engine(s) 622, one or more observed data module(s) 624, one or more content similarity determination module(s) 626, and/or one or more variable adjustment module(s) 628. Some or all of these module(s) may be sub-module(s). Any of the components depicted as being stored in data storage 616 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 616 may support functionality described in reference to correspondingly named components earlier in this disclosure.

The data storage 616 may further store various types of data utilized by components of the variable management server(s) 600. Any data stored in the data storage 616 may be loaded into the memory 604 for use by the processor(s) 602 in executing computer-executable code. In addition, any data depicted as being stored in the data storage 616 may potentially be stored in one or more datastore(s) and may be accessed via the DBMS 620 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, observed data, historical campaign performance, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the variable management server(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the predictive modeling engine(s) 622 may include computer-executable instructions, code, or the like that responsive to execution by one or more of the processor(s) 602 may perform functions including, but not limited to, analyzing observed data, determining current parameter values, generating predictive models, generating adjustment recommendations for one or more campaign parameters, and the like.

The observed data module(s) 624 may include computer-executable instructions, code, or the like that responsive to execution by one or more of the processor(s) 602 may perform functions including, but not limited to, communicating with one or more devices, for example, via wired or wireless communication, receiving or collecting observed data, monitoring user interaction, tracking content delivery, and the like.

The content similarity determination module(s) 626 may include computer-executable instructions, code, or the like that responsive to execution by one or more of the processor(s) 602 may perform functions including, but not limited to, determining a similarity between one or more pieces of content or campaigns, aggregating observed data, setting or modifying a similarity threshold, and the like.

The variable adjustment module(s) 628 may include computer-executable instructions, code, or the like that responsive to execution by one or more of the processor(s) 602 may perform functions including, but not limited to, sending recommended parameter adjustments, facilitating adjustments to parameters, actively adjusting parameters, and the like.

Referring now to other illustrative components depicted as being stored in the data storage 616, the 0/S 618 may be loaded from the data storage 616 into the memory 604 and may provide an interface between other application software executing on the variable management server(s) 600 and hardware resources of the variable management server(s) 600. More specifically, the 0/S 618 may include a set of computer-executable instructions for managing hardware resources of the variable management server(s) 600 and for providing common services to other application programs (e.g., managing memory allocation among various application programs). In certain example embodiments, the 0/S 618 may control execution of the other program module(s) to dynamically enhance characters for content rendering. The O/S 618 may include any operating system now known or which may be developed in the future including, but not limited to, any server operating system, any mainframe operating system, or any other proprietary or non-proprietary operating system.

The DBMS 620 may be loaded into the memory 604 and may support functionality for accessing, retrieving, storing, and/or manipulating data stored in the memory 604 and/or data stored in the data storage 616. The DBMS 620 may use any of a variety of database models (e.g., relational model, object model, etc.) and may support any of a variety of query languages. The DBMS 620 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the variable management server(s) 600 is a mobile device, the DBMS 620 may be any suitable light-weight DBMS optimized for performance on a mobile device.

Referring now to other illustrative components depicted as being stored in the data storage 616, the 0/S 618 may be loaded from the data storage 616 into the memory 604 and may provide an interface between other application software executing on the variable management server(s) 600 and hardware resources of the variable management server(s) 600. More specifically, the 0/S 618 may include a set of computer-executable instructions for managing hardware resources of the variable management server(s) 600 and for providing common services to other application programs (e.g., managing memory allocation among various application programs). In certain example embodiments, the 0/S 618 may control execution of one or more of the program module(s) depicted as being stored in the data storage 616. The O/S 618 may include any operating system now known or which may be developed in the future including, but not limited to, any server operating system, any mainframe operating system, or any other proprietary or non-proprietary operating system.

The DBMS 620 may be loaded into the memory 604 and may support functionality for accessing, retrieving, storing, and/or manipulating data stored in the memory 604 and/or data stored in the data storage 616. The DBMS 620 may use any of a variety of database models (e.g., relational model, object model, etc.) and may support any of a variety of query languages. The DBMS 620 may access data represented in one or more data schemas and stored in any suitable data repository. In certain example embodiments, the DBMS 620 may be any suitable light-weight DBMS optimized for performance on a mobile device.

Referring now to other illustrative components of the variable management server(s) 600, the input/output (I/O) interface(s) 606 may facilitate the receipt of input information by the variable management server(s) 600 from one or more I/O devices as well as the output of information from the variable management server(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the variable management server(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 630 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The variable management server(s) 600 may further include one or more network interface(s) 608 via which the variable management server(s) 600 may communicate with any of a variety of other systems, platforms, networks, devices, and so forth. The network interface(s) 608 may enable communication, for example, with the wireless router 108, the host server 112, and/or one or more web servers (e.g., the web server 406) via one or more of the network(s) 110.

The antenna(e) 630 may include any suitable type of antenna depending, for example, on the communications protocols used to transmit or receive signals via the antenna (e) 630. Non-limiting examples of suitable antennas may include directional antennas, non-directional antennas, dipole antennas, folded dipole antennas, patch antennas, multiple-input multiple-output (MIMO) antennas, or the like. The antenna(e) 630 may be communicatively coupled to one or more transceivers 612 or radio components to which or from which signals may be transmitted or received.

As previously described, the antenna(e) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 630 may additionally, or alternatively, include a Wi-Fi antenna configured to transmit or receive signals in accordance with established standards and protocols, such as the IEEE 602.11 family of standards, including via 2.4 GHz channels (e.g. 602.11b, 602.11g, 602.11n), 5 GHz channels (e.g. 602.11n, 602.11ac), or 60 GHZ channels (e.g. 602.11ad). In alternative example embodiments, the antenna(e) 630 may be configured to transmit or receive radio frequency signals within any suitable frequency range forming part of the unlicensed portion of the radio spectrum.

The antenna(e) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 630—transmitting or receiving radio frequency (RF) signals in the bandwidth and/or channels corresponding to the communications protocols utilized by the variable management server(s) 600 to communicate with other devices. The transceiver(s) 612 may include hardware, software, and/or firmware for modulating, transmitting, or receiving—potentially in cooperation with any of antenna(e) 630—communications signals according to any of the communications protocols discussed above including, but not limited to, one or more Wi-Fi and/or Wi-Fi direct protocols, as standardized by the IEEE 602.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the variable management server(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 6 as being stored in the data storage 616 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the variable management server(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the variable management server(s) 600 may include alternate and/or additional hardware, software, or firmware components beyond those described or depicted without departing from the scope of the disclosure. More particularly, it should be appreciated that software, firmware, or hardware components depicted as forming part of the variable management server(s) 600 are merely illustrative and that some components may not be present or additional components may be provided in various embodiments. While various illustrative program module(s) have been depicted and described as software module(s) stored in data storage 616, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to at least one memory, a first output to maximize, wherein the first output is a function of a first adjustable parameter and a second adjustable parameter;
   determining first data comprising a first actual value of the first output when the first adjustable parameter is set to a first value and the second adjustable parameter is set to a second value;
   determining a first predictive model that generates a first predicted value of the first output;
   determining, using the first predictive model, a third value for the first adjustable parameter and a fourth value for the second adjustable parameter to maximize the first predicted value;
   determining a first confidence score indicative of a correlation between the third value and the fourth value and maximization of the first output;
   determining that the first confidence score satisfies a first minimum confidence threshold;
   sending the third value and the fourth value, wherein the first adjustable parameter is set to the third value and the second adjustable parameter is set to the fourth value;
   delivering first content based at least in part on the first adjustable parameter and the second adjustable parameter, wherein the first data further comprises first user interaction data indicative of user interaction responsive to the first content;
   determining a first set of product identifiers associated with the first content;
   determining a first browse node hierarchy for the first set of product identifiers, wherein the first browse node hierarchy is a first alphanumeric value based at least in part on the first set of product identifiers;
   determining a second set of product identifiers associated with the second content;
   determining a second browse node hierarchy for the second set of product identifiers, wherein the second browse node hierarchy is a second alphanumeric value based at least in part on the second set of product identifiers;
   determining a distance between the first browse node hierarchy and the second browse node hierarchy;
   determining that the distance meets the similarity metric;
   receiving second data comprising second user interaction data indicative of user interaction responsive to the second content; and
   generating a set of content comprising the first content and the second content.

2. The method of claim 1, further comprising:
   adjusting the first adjustable parameter to the third value;
   adjusting the second adjustable parameter to the fourth value;
   receiving second data comprising a second actual value of the first output when the first adjustable parameter is set to the third value and the second adjustable parameter is set to the fourth value; and generating a second predictive model that generates a second predicted value of the first output based at least in part on the first data and the second data.

3. The method of claim 2, further comprising:
determining a difference between the second actual value and the first predicted value;
determining a second confidence score indicative of a likelihood of accuracy of the second predictive model using the difference; and
determining a model accuracy based at least in part on the second confidence score.

4. The method of claim 1, wherein determining that the second content meets the content similarity metric with respect to the first content comprises at least one of determining a product identifier associated with the second content or determining a distribution channel of the second content.

5. The method of claim 1, further comprising adjusting a base bid or a maximum bid for delivering content using the first predictive model.

6. The method of claim 1, further comprising delivering content at a delivery rate based at least in part on the first adjustable parameter.

7. The method of claim 1, wherein the first output is a return on a content delivery budget for an ad campaign, the first adjustable parameter is a base bid, the second adjustable parameter is a frequency cap, and wherein the first data further comprises observed sales data for sales attributed to the ad campaign.

8. The method of claim 1, wherein the first predictive model is modeled as a Gaussian process.

9. A device comprising:
at least one memory that stores computer-executable instructions; and
at least one processor configured to access the at least one memory and execute the computer-executable instructions to:
determine a first output to maximize, wherein the first output is a function of a first adjustable parameter and a second adjustable parameter;
determine first data comprising a first actual value of the first output when the first adjustable parameter is set to a first value and the second adjustable parameter is set to a second value;
determine a first predictive model that generates a first predicted value of the first output;
determine, using the first predictive model, a third value for the first adjustable parameter and a fourth value for the second adjustable parameter to maximize the first predicted value;
determine a first confidence score indicative of a correlation between the third value and the fourth value and maximization of the first output;
determine that the first confidence score satisfies a first minimum confidence threshold;
send the third value and the fourth value;
deliver first content based at least in part on the first adjustable parameter and the second adjustable parameter, wherein the first data further comprises first user interaction data indicative of user interaction responsive to the first content;
determine a first set of product identifiers associated with the first content;
determine a first browse node hierarchy for the first set of product identifiers, wherein the first browse node hierarchy is a first alphanumeric value based at least in part on the first set of product identifiers;

determine a second set of product identifiers associated with the second content;
determine a second browse node hierarchy for the second set of product identifiers, wherein the second browse node hierarchy is a second alphanumeric value based at least in part on the second set of product identifiers;
determine a distance between the first browse node hierarchy and the second browse node hierarchy;
determine that the distance meets the similarity metric;
receive second data comprising second user interaction data indicative of user interaction responsive to the second content; and
generate a set of content comprising the first content and the second content.

10. The device of claim 9, wherein the at least one processor is further configured to access the at least one memory and execute the computer-executable instructions to:
adjust the first adjustable parameter to the third value;
adjust the second adjustable parameter to the fourth value;
receive second data comprising a second actual value of the first output when the first adjustable parameter is set to the third value and the second adjustable parameter is set to the fourth value; and
generate a second predictive model that generates a second predicted value of the first output based at least in part on the first data and the second data.

11. The device of claim 10, wherein the at least one processor is further configured to access the at least one memory and execute the computer-executable instructions to:
determine a difference between the second actual value and the first predicted value;
determine a second confidence score indicative of a likelihood of accuracy of the second predictive model using the difference; and
determine a model accuracy based at least in part on the second confidence score.

12. The device of claim 9, wherein the at least one processor is configured to determine that the second content meets the content similarity metric with respect to the first content by accessing the at least one memory and execute the computer-executable instructions to determine at least one of a product identifier associated with the second content, or a distribution channel of the second content.

13. A computer-readable medium storing computer-executable instructions which, when executed by a processor, cause the processor to perform operations comprising:
determining, by one or more computer processors coupled to at least one memory, a first output to maximize, wherein the first output is a function of a first adjustable parameter and a second adjustable parameter;
determining first data comprising a first actual value of the first output when the first adjustable parameter is set to a first value and the second adjustable parameter is set to a second value;
determining a first predictive model that generates a first predicted value of the first output;
determining, using the first predictive model, a third value for the first adjustable parameter and a fourth value for the second adjustable parameter to maximize the first predicted value;
determining a first confidence score indicative of a correlation between the third value and the fourth value and maximization of the first output;

determining that the first confidence score satisfies a first minimum confidence threshold;

sending the third value and the fourth value, wherein the first adjustable parameter is set to the third value and the second adjustable parameter is set to the fourth value;

delivering first content based at least in part on the first adjustable parameter and the second adjustable parameter, wherein the first data further comprises first user interaction data indicative of user interaction responsive to the first content;

determining a first set of product identifiers associated with the first content;

determining a first browse node hierarchy for the first set of product identifiers, wherein the first browse node hierarchy is a first alphanumeric value based at least in part on the first set of product identifiers;

determining a second set of product identifiers associated with the second content;

determining a second browse node hierarchy for the second set of product identifiers, wherein the second browse node hierarchy is a second alphanumeric value based at least in part on the second set of product identifiers;

determining a distance between the first browse node hierarchy and the second browse node hierarchy;

determining that the distance meets the similarity metric;

receiving second data comprising second user interaction data indicative of user interaction responsive to the second content; and generating a set of content comprising the first content and the second content.

14. The computer-readable medium of claim 13, wherein the operations further comprise:

adjusting the first adjustable parameter to the third value;

adjusting the second adjustable parameter to the fourth value;

receiving second data comprising a second actual value of the first output when the first adjustable parameter is set to the third value and the second adjustable parameter is set to the fourth value; and generating a second predictive model that generates a second predicted value of the first output based at least in part on the first data and the second data.

15. The computer-readable medium of claim 14, wherein the operations further comprise:

determining a difference between the second actual value and the first predicted value;

determining a second confidence score indicative of a likelihood of accuracy of the second predictive model using the difference; and determining a model accuracy based at least in part on the second confidence score.

16. The computer-readable medium of claim 13, wherein determining that the second content meets the content similarity metric with respect to the first content comprises at least one of determining a product identifier associated with the second content or determining a distribution channel of the second content.

17. The computer-readable medium of claim 13, wherein the operations further comprise:

adjusting a base bid or a maximum bid for delivering content using the first predictive model.

18. The computer-readable medium of claim 13, wherein the operations further comprise:

delivering content at a delivery rate based at least in part on the first adjustable parameter.

19. The computer-readable medium of claim 13, wherein the first output is a return on a content delivery budget for an ad campaign, the first adjustable parameter is a base bid, the second adjustable parameter is a frequency cap, and wherein the first data further comprises observed sales data for sales attributed to the ad campaign.

20. The computer-readable medium of claim 13, wherein the first predictive model is modeled as a Gaussian process.

* * * * *